Nov. 19, 1968  M. BAERMANN  3,411,243
PERMANENT MAGNET GASKET
Filed June 8, 1966
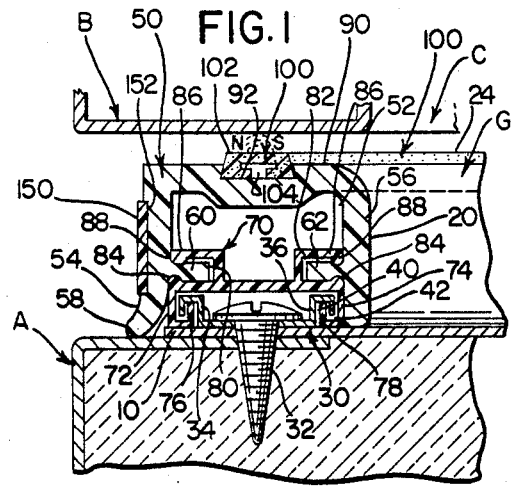
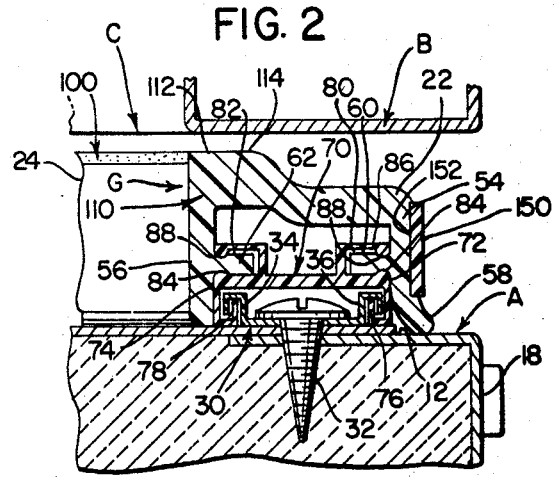
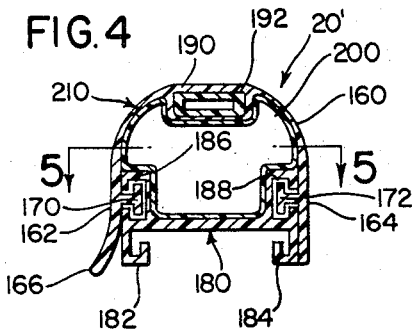
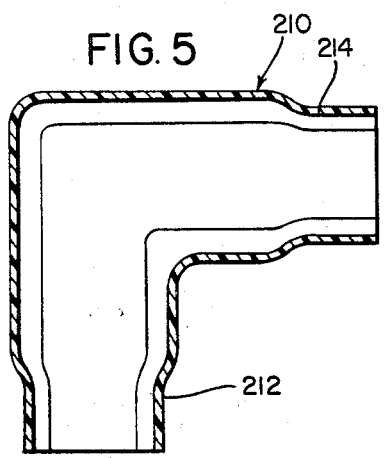
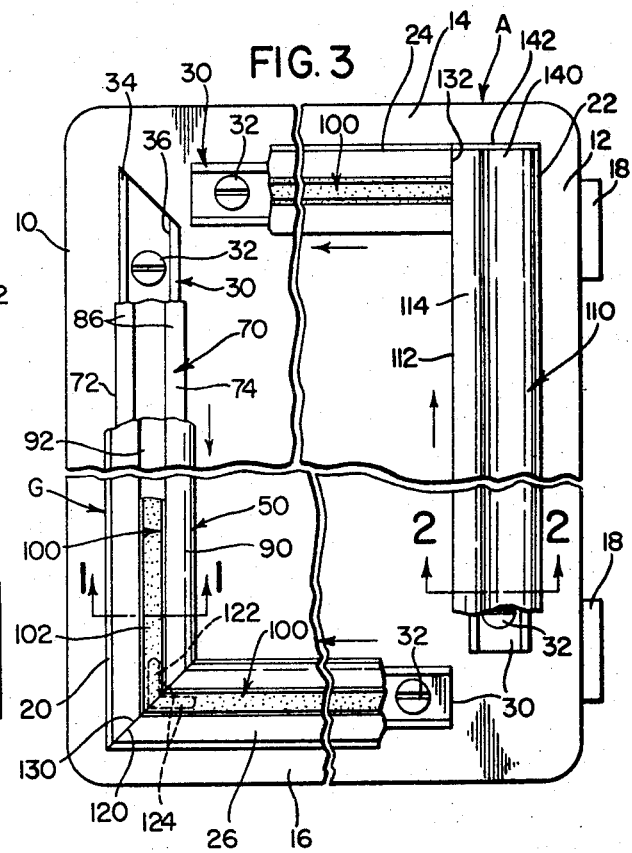
INVENTOR.
MAX BAERMANN
BY
Meyer, Tilberry & Body
ATTORNEYS

United States Patent Office 3,411,243
Patented Nov. 19, 1968

3,411,243
PERMANENT MAGNET GASKET
Max Baermann, 506 Bensberg Wulfshof, Bezirk,
Cologne (Rhine), Germany
Filed June 8, 1966, Ser. No. 556,222)
Claims priority, application Germany, Nov. 17, 1965,
B 84,547
9 Claims. (Cl. 49—478)

ABSTRACT OF THE DISCLOSURE

A structure for mounting a flexible permanent magnet around the periphery of a closure. This structure includes a rigid rail attached onto the closure; a vertically deformable strip with the maget secured to the upper portion thereof; and a rigid adaptor secured onto the lower portion of the deformable strip and telescopically received in the rail by a simple sliding movement.

Disclosure

This invention pertains to the art of gaskets, and more particularly to a permanent magnet gasket.

The invention is particularly applicable for use as a gasket secured upon and extending around the periphery of a refrigerator door to perform both the function of a seal between the door and the cabinet and a latch to hold the door in its closed position, and it will be described with particular reference thereto; however, it will be appreciated that the invention has much broader applications and may be used as a gasket and latch for various other closure elements. In addition, the gasket may be secured onto the refrigerator cabinet to coact with the door.

It has become somewhat common practice in the manufacture of refrigerators to provide the gasket extending around the door with an elongated, flexible permanent magnet. In this manner, the gasket performed the dual function of a seal and a releasable latch. These prior permanent magnet gaskets generally included a collapsible, tubular gasket element formed from a non-magnet material, such as plastic. A flexible permanent magnet strip was provided within this element, usually in a pocket adjacent the surface facing the refrigerator frame or cabinet. In some cases, the permanent magnet was secured to the outside of the tubular gasket element so that the flexible perment magnet directly contacted the frame of the refrigerator to hold the door closed. In all of these prior refrigerator door gaskets of the flexible permanent magnet type, the gasket was formed into a unit having a rectangular shape before it was applied onto the door. The tubular gasket element was, by necessity, welded at the various corners. Corner welding of the plastic material forming the gasket was relatively expensive, and the thickness of the plastic walls was increased. Consequently, the gasket unit lost its elasticity at the corners. The corner portions of the gasket unit could not compensate easily for various surface irregularities on the refrigerator frame. This rendered the gasket somewhat less efficient in its sealing function at these welded corners.

These prior flexible permanent magnet refrigerator door gaskets had to be shipped in the previously-mentioned rectangular assembled condition. This was done by packing a number of gasket units onto specially made cardboard frames. Due to the big volume of packing the assembled units in this manner, the shipping and storing costs were relatively high. With the prior gaskets being assembled into a rectangular unit, it was somewhat difficult to secure the unit onto the refrigerator door, especially in the areas adjacent the corners. It was difficult to provide fastening means at the corners; therefore, these previous permanent magnet gaskets have been somewhat unsatisfactory in sealing refrigerator cabinets adjacent the four corners of the gasket unit.

These and other disadvantages of the previous permanent magnet gaskets for refrigerator doors have been overcome by the present invention which is directed toward such a permanent manget gasket which may be easily installed onto the refrigerator door with tight joints at the various corners.

In accordance with the present invention, there is provided an elongated permanent magnet gasket for releasably and magnetically holding a closure element over an opening defined by a frame element extending around the opening. This gasket comprises an elongated mounting rail having coupling means and being adapted to be secured onto one of the aforementioned elements; an elongated resilient, vertically deformable strip having an outwardly facing portion and a lower portion; an elongated flexible permanent magnet having a latching surface with at least one pair of opposite polarity magnetic poles; the permanent magnet is coextensive with the strip and is mounted adjacent the outwardly facing surface; and an elongated, rigid adaptor secured onto the lower portion of the strip and having second coupling means for coupling the rigid adaptor with the previously mentioned first coupling means.

By this construction, the elongated mounting rail can be first secured onto an element, such as one side of a refrigerator door. Thereafter, the vertically deformable strip with an upper flexible permanent magnet and a lower rigid adaptor can be fixedly secured onto the rail. Thus, all portions of the gasket are securely fastened to the rail by the rigid adaptor at the lower portion of the deformable strip.

In accordance with another aspect of the present invention, the coupling means on the rigid adaptor and the coupling means on the mounting rail are coacting, longitudinally extending recesses and ribs so that the gasket is mounted on the rail by longitudinal movement of the gasket along the rail. By this construction, a separate rail may be mounted adjacent each edge of the refrigerator door and the various gasket portions can be longitudinally moved along the rail to secure them adjacent the various edges. By proper sequencing the order of assembly, the various gasket units may form interfering corner joints so that they are secured as a somewhat stable assembly around the door.

Essentially, the non-magnetic, deformable gasket element which carries the flexible, permanent magnet strip and the rigid adaptor forms the major portion of the gasket. The adaptor, instead of the resilient gasket element itself, is secured onto the mounting rail. The mounting rail may be made of plastic or metal and secured onto the refrigerator by screws, or other similar fastening elements. A gasket constructed in accordance with the present invention is freely deformable in a direction perpendicular to the refrigerator door surface so that it can conform with various surface irregularities along the refrigerator frame or cabinet. On the other hand, in a direction transverse to the gasket, the gasket is somewhat rigid so that it can be easily attached onto the mounting rails without requiring various snap fittings and other arrangements which can contribute to inadvertent separation of the gasket. The resilient or deformable gasket element may be formed from a foamed or sponge plastic or rubber. This material presents a large surface area, and it can be joined by adhesive at the various joints between adjacent gasket portions. This material does not require welding which is usually necessary when certain other plastic materials are employed as the resilient member for a permanent magnet gasket. Since an adhesive may be used at the corners, there is no increase in the wall thickness of the resilient gasket element adjacent the four corners, as was the case when the resilient, flexible gasket element had to be welded. Without such welding, the resiliency and deformability of the flexible gasket element is not seriously impaired.

In accordance with another aspect of the present invention, the rigid non-magnetic adaptor is provided with outwardly directed recesses which can receive inwardly extending ribs at the bottom portion of the elastic, deformable gasket element. In this way, the deformable gasket element which carries the flexible permanent magnet can be secured conveniently onto the rigid adaptor without complicated assembly procedures.

The primary object of the present invention is the provision of a permanent magnet gasket of the type used on a refrigerator door, which gasket is easy to assemble, inexpensive to ship and store, and tight sealing in all areas.

Another object of the present invention is the provision of a permanent magnet gasket of the type used on refrigerator doors, which gasket includes a mounting rail secured onto the refrigerator, a rigid adaptor carrying the other components of the gasket, and means for assembling the adaptor onto the rail.

Still another object of the present invention is the provision of a permanent magnet gasket of the type used on refrigerator doors, which gasket includes a mounting rail secured onto the refrigerator, a rigid adaptor carrying the other components of the gasket, and means for assembling the adaptor onto the rail with a sliding motion in a direction axial of the rail.

These and other objects and advantages will become apparent from the following description used to illustrate preferred embodiments of the invention as read in connection with the accompanying drawing in which:

FIGURE 1 is an enlarged cross-sectional view taken generally along line 1—1 of FIGURE 3;

FIGURE 2 is an enlarged cross-sectional view taken generally along line 2—2 of FIGURE 3;

FIGURE 3 is a partially cut-away view illustrating, somewhat schematically, the preferred embodiment of the present invention;

FIGURE 4 is an enlarged cross-sectional view illustrating a modification of the present invention; and, FIGURE 5 is an enlarged cross-sectional view taken generally along line 5—5 of FIGURE 4.

Referring now to the drawing wherein the showings are for the purpose of illustrating preferred embodiments of the invention only and not for the purpose of limiting same, FIGURES 1–3 show a refrigerator door A adapted to be magnetically latched against a ferro-magnetic frame B which is constructed to define an opening C. The door A includes edge surfaces 10, 12, 14 and 16 with the surface 16 having hinge mounts 18 for supporting door hinges, not shown. A gasket G extends around the opening C, and, preferably, the gasket is secured onto the door A. The gasket is divided into portions 20, 22, 24, and 26 with all of these portions being substantially identical, with the exception of certain modifications of portion 22 extending along the hinge surface 12. Since these gasket portions are somewhat identical, portion 20 will be described in detail, and this description will apply equally to the other portions of the gasket G.

Each gasket portion includes a mounting rail 30 formed from metal or rigid plastic and secured onto the door surfaces by appropriately spaced screws 32. The rail includes transversely spaced bent portions 34, 36 which form longitudinally extending recesses 40 having outwardly facing openings 42. A resilient, vertically deformable strip 50, which is preferably formed from a foamed or sponge plastic or rubber material, is constructed to form an internal cavity 52. This cavity allows deformation of the strip 50 in a direction generally perpendicular to both the door surfaces and the frame B. This strip allows the gasket to conform with various surface irregularities generally found along the frame or cabinet of a refrigerator. The deformable strip 50 includes depending legs 54, 56 with leg 54 having a sealing lip 58 adapted to form a seal with the door surfaces. Legs 54, 56 are provided with inwardly extending, resilient ribs 60, 62. The lower portion of strip 50 is secured onto a rigid adaptor 70, formed from metal or a rigid plastic material. This adaptor includes transversely spaced legs 72, 74 having upturned ribs 76, 78, respectively. These ribs extend through openings 42, of recesses 40 within rail 30 to form interlocking coupling means which can be joined by relative axial movement between the adaptor and the mounting rail.

Referring now to the upper portion of adaptor 70, there are provided longitudinally extending recesses 80, 82 defined by a bottom wall having a shoulder 84 and an upper biased flange 86 having a shoulder 88. The shoulders 84, 88 grip the ribs 60, 62 so that the strip 50 is tightly secured with respect to the adaptor. In accordance with the preferred embodiment of the present invention, the adaptor 70 is formed from a hard or unplasticized polyvinyl chloride which is extruded in the general shape shown in FIGURES 1 and 2. Before the adaptor cools after extrusion, the flanges 86 are forced apart so that they solidify or harden in an upwardly deformed condition. Immediately thereafter, strip 50 is secured over the adaptor with the resilient ribs 60, 62 extending into the enlarged or deformed recesses 80, 82. After the strip 50 is properly positioned with respect to the adaptor 70, the flanges 86 are again heated. This causes the flanges to spring backwardly into their original extruded shape to bring shoulders 84, 88 together. This forms a tight clamp between the adaptor and ribs 60, 62. Of course, other arrangements could be provided for securing the adaptor onto the lower portion of the vertically deformable strip 50.

Strip 50 includes an outwardly facing surface 90 having a dove-tail slot 92. An elongated flexible permanent magnet 100 having a dove-tail shape is slipped into slot 92, where it is secured by an appropriate adhesive material. The flexible permanent magnet is formed by conventional procedures, and it includes finely divided permanently magnetizable particles dispersed throughout and bonded within a flexible matrix, such as rubber or plastic. This magnet includes a generally flat upper latching surface 102 facing the frame B. To provide magnetic attraction between the surface 102 and the frame B, at least one pair of opposite polarity magnetic poles are provided on this latching surface. In FIGURE 1, two longitudinally extending poles are illustrated. It is appreciated that various other pole arrangements could be provided on the surface 102 without departing from the intended spirit and scope of the present invention. The permanent magnet 100 is provided with a longitudinally extending T-slot 104, for a purpose to be hereinafter described.

Referring now to the gasket portion 22 adjacent the hinge surface 12, this portion differs from the other portions of the gasket, in accordance with the preferred embodiment of the invention, by including a resilient, vertically deformable strip 110 having a lower portion with basically the same structural characteristics as strip 50. The strip 110 is modified to provide an upper longitudinally extending, protruding boss 112 having an outermost surface 114 which is generally the same height as surface 102 of magnet 100. In this manner, no permanent magnet is provided along the hinge surface of the door. It is appreciated that in some instances, a permanent magnet may be provided along the hinge surface of the door; therefore, the deformable strip 50 with the magnet 100 would be provided in place of the strip 110.

Referring now to FIGURE 3, the assembly of the gasket G is illustrated schematically. The strips 50, 110 of the various gasket portions are provided with the adaptors 70 and, in the case of strips 50, with the flexible magnets 100. The assembly of the adaptor and magnet onto the resilient strips can be performed in a continuous operation subsequent to extrusion of the various components. Referring now to gasket portion 20, this portion is mitered at each end, such as at end 120, to give the required length to this portion of the gasket. Thereafter, the strip 50 with the assembled adaptor 70 is slipped axially over the rail 30 on surface 10. The ribs 76, 78 are received within recesses 40 so that the adaptor 70, holding strip 50, is secured from movement both vertically and transversely. To provide the mitered corners, the foam or sponge material forming the strip 50 may be frozen and then mitered. This provides a smooth surface which will allow tight fit between the mitered ends of the strips 50. After portion 20 is in place, angle supports 122 are forced into the slot 104 of magnets 100. These angle supports include orthogonal legs 124 which extend axially along rails 30 on the surfaces 14, 16 After this has been accomplished, gasket portions 24, 26 are mitered at one end 130. The other end 130 is provided with a straight cut as shown in FIGURE 3. These portions are slipped over the appropriate rails 30 until the mitered ends 130 abut the previously mitered ends 120 of portion 20. At this time, an appropriate adhesive can join the mitered ends to provide a tight corner joint. The upper and lower rails 30 extend to the corner area defined by the mitered joints so that the gasket G is tightly secured with respect to the door at these corners. Since no welding is required between the resilient strips 50, the resiliency of these strips is maintained even at the corners.

Referring now to portion 22, the vertically deformable strip 110 is cut to the appropriate length. Thereafter, the adaptor 70 at the lower portion of strip 110 is slipped over the rail 30 extending along hinge surface 12. The opposite ends 140 of the strip 110 abut ends 132 of the strips 50 used in portions 24, 26. In this manner, the complete gasket is held in place or locked in place with respect to the inner surface of door A.

As so far described, the inner cavity of strip 110 would be exposed at spaced ends 140. Consequently, a piece of decorative tape or, a cap 142 is placed over the ends of the strip 110. To provide even a more pleasing appearance on the outer surface of gasket G, the caps 142 may be replaced by a continuous tape 150 extending around the various strips 50, 110, as shown in FIGURES 1 and 2. In accordance with the preferred embodiment of this aspect of the invention, a recess 152 is provided within the strips 50, 110. This recess receives the decorative tape 150 which extends around the complete magnet assembly to hold the assembly in place and also close the cavity of strip 110 at ends 140.

Referring now to FIGURES 4 and 5, a further modification of the present invention is illustrated. In accordance with this modification, the gasket portion 20' is provided with a resilient, vertically deformable strip 160 formed from a plasticized polyvinyl chloride or a similar plastic material. This strip includes spaced legs 162, 164 with leg 162 having a downwardly extending sealing lip 166. T-shaped ribs 170, 172 face inwardly from the legs 162, 164, respectively. A rigid adaptor 180 is secured to the lower portion of strip 160 and includes coupling legs 182, 184. These legs are adapted to join with a rail 30 of the type previously described. The upper portion of adaptor 180 includes outwardly opening T-shaped recesses 186, 188. These recesses are adapted to receive the ribs 170, 172 by an axial sliding motion between the strip 160 and adaptor 180. Of course, thermally deformable flanges could be provided for securing the strip onto the adaptor, in a manner previously described. The upper portion of strip 160 includes a longitudinally extending tube 190 for receiving a flexible permanent magnet 192. The details of this structure are not explained because they do not form a part of this invention.

In accordance with the invention, the tube 160 and adaptor 180 combine to form a longitudinally extending cavity 200. A contoured flexible, plastic tube 210, best shown in FIGURE 5, is provided with orthogonally disposed legs 212, 214. These legs extend into the cavities 200 of adjacent gasket portions to provide a tight seal at the corner area. In other words, leg 212 extends into one gasket portion, and leg 214 extends into the abutting gasket portion. An adhesive is applied to the gasket before it is assembled with respect to the strip 160 so that it may be adhesively secured at the corner areas of these strips.

The present invention has been described in connection with certain structural embodiments; however, it is appreciated that various changes may be made in these embodiments without departing from the intended spirit and scope of the present invention as defined by the appended claims.

Having thus defined my invention, I claim:

1. An elongated permanent magnet gasket for releasably and magnetically holding a closure element over an opening defined by a frame element extending around said opening, said gasket comprising: an elongated mounting rail having a first coupling means, said rail adapted to be secured onto one of said elements and coextensive with said opening; an elongated resilient, vertically deformable strip having an outwardly facing portion and a lower portion; an elongated flexible permanent magnet having a latching surface with at least one pair of opposite polarity magnetic poles; said permanent magnet being coextensive with said strip and mounted adjacent said outwardly facing surface with said latching surface facing said other element; and an elongated, rigid adaptor permanently secured onto said lower portion of said strip to form a substantially integral compound unit, and said adaptor having second coupling means for coupling said rigid adaptor with said first coupling means.

2. A gasket as defined in claim 1 wherein said rigid adaptor includes two spaced recesses and said resilient strip includes two downwardly extending legs each having protruding resilient ribs, said ribs being secured within said recesses.

3. A gasket as defined in claim 2 wherein said recesses are outwardly facing and said ribs are inwardly facing.

4. A gasket as defined in claim 2 wherein said recesses are each defined with at least one flange, said flanges being biased into locking engagement with said ribs.

5. A gasket as defined in claim 1 wherein one of said coupling means is a longitudinally extending recess and the other of said coupling means is a longitudinally extending rib receivable in said recess by relative longitudinal movement between said adaptor and said rail.

6. A gasket as defined in claim 5 wherein said first coupling means includes said recess.

7. A gasket as defined in claim 5 wherein said recess has a locking shoulder preventing transverse removal of said rib from said recess.

8. A gasket as defined in claim 1 wherein said deformable strip is formed from a sponge material.

9. An elongated permanent magnet gasket for releasably and magnetically holding a closure element over an opening defined by a frame element extending around said opening, said gasket comprising: an elongated mounting rail having longitudinally extending first coupling means, said mounting rail adapted to be secured onto one of said elements and coextensive with said opening; an elongated resilient, vertically deformable strip having an outwardly facing portion and a lower portion; an elongated flexible permanent magnet having a latching surface with at least one pair of opposite polarity magnetic poles, said permanent magnet being coextensive with said strip and mounted adjacent said outwardly facing surface with said latching surface facing said other element; and a longitudinally extending second rigid non-deformable coupling means secured onto said lower portion of said strip, said non-deformable strip being coupled with said mounting rail.

References Cited

UNITED STATES PATENTS

| | | | |
|---|---|---|---|
| 2,102,578 | 12/1937 | Gail | 49—493 |
| 2,958,912 | 11/1960 | Bower et al. | 49—478 |
| 2,974,079 | 3/1961 | Korotkevich | 49—479 X |
| 3,023,466 | 3/1962 | Landis | 49—493 X |
| 3,079,653 | 3/1963 | Cornell | 49—493 |
| 3,125,389 | 3/1964 | Swaneck | 49—478 X |
| 3,221,375 | 12/1965 | Lewis et al. | 49—478 |
| 3,241,198 | 3/1966 | Baermann | 49—478 |

DAVID J. WILLIAMOWSKY, *Primary Examiner.*

P. C. KANNAN, *Assistant Examiner.*